(12) United States Patent  
Obara et al.

(10) Patent No.: US 6,655,847 B2  
(45) Date of Patent: Dec. 2, 2003

(54) PIVOT BEARING ASSEMBLY

(75) Inventors: Rikuro Obara, Miyota-machi (JP); Toshisada Koyama, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/969,955

(22) Filed: Oct. 3, 2001

(65) Prior Publication Data

US 2002/0039461 A1 Apr. 4, 2002

(30) Foreign Application Priority Data

Oct. 4, 2000 (JP) ........................................ 2000-304411

(51) Int. Cl.⁷ ............................ F16C 19/08; F16C 27/00
(52) U.S. Cl. ...................................... 384/535; 384/512
(58) Field of Search ................................ 384/535, 512; 360/265.6

(56) References Cited

U.S. PATENT DOCUMENTS

| | | | | |
|---|---|---|---|---|
| 5,315,465 A | * | 5/1994 | Blanks ................... | 360/265.6 |
| 5,806,989 A | * | 9/1998 | Obara et al. ............. | 384/512 |
| 5,969,449 A | * | 10/1999 | Obara ..................... | 384/512 |
| 6,163,441 A | * | 12/2000 | Wood et al. ............. | 360/266.1 |
| 6,288,879 B1 | * | 9/2001 | Misso et al. ............ | 360/265.6 |

* cited by examiner

Primary Examiner—Thomas R. Hannon
(74) Attorney, Agent, or Firm—Frishauf, Holtz, Goodman & Chick, P.C.

(57) ABSTRACT

A pivot bearing assembly comprises a shaft having a main body portion and a reduced portion integrally and coaxially formed therewith, an outer ring-sleeve member coaxially surrounding the shaft, a first bearing arranged between the reduced portion of the shaft and the outer ring-sleeve member, a second bearing arranged between the main body portion of the shaft and the outer ring-sleeve member and a tolerance ring mounted on the outer peripheral surface of the outer ring-sleeve member. The inner ring of the second bearing is a part of the main body portion of the shaft. The outer ring-sleeve member can comprise an outer ring and a sleeve tightly mounted on the outer ring or an outer ring portion and a sleeve portion surrounding the outer ring and integrally formed therewith.

10 Claims, 4 Drawing Sheets

PIVOT BEARING ASSEMBLY

BACKGROUND OF THE INVENTION

1. Field of the Invention

The present invention relates to a pivot bearing apparatus for axially supporting rotating members including swing arms carrying magnetic heads for recording and reproducing signals on disks.

2. Description of the Related Art

Recently, a miniaturized and lighter-weight disc has been greatly demanded. In doing so, memory density of a disc (such as a hard disc) in the disc device has been increased, with the result that the width of a track for writing signals has become narrower and narrower. A magnetic head for recording signals on and reproducing the same from the disc is mounted on the swing arm of an actuator. The magnetic head is brought to a required recording and reproducing position on the disc by swinging the swing arm. Thus, high rotational positioning accuracy must be achieved. Since the actuator having the swing arm is supported on an actuator block by the pivot bearing assembly, the positioning accuracy of the swing arm is determined by the rotational accuracy of the pivot bearing assembly.

The conventional pivot bearing assembly comprises a shaft, two bearings surrounding the shaft and each having an inner race and an outer race, rolling elements such as balls disposed between them and a sleeve in which those two bearings are inserted. Even if the pivot bearing assembly is miniaturized, its structure and its number of constituent components are unchanged.

When a radially inward directed pressure is applied to the outer races of the bearings, the radial clearance between the balls and the outer race of the pivot bearing assembly becomes smaller, causing friction between the balls and the raceway grooves formed in the outer rings of the bearings. This increases the driving torque for rotating the pivot bearing assembly, and, therefore, the bearings rotate very heavily.

When the bearings are mounted on the shaft and/or the sleeve of the pivot bearing assembly in an inclined state, the radial clearance of the pivot bearing assembly becomes unstable, creating torque fluctuation and/or torque spike. This brought up unstable rotation of the pivot bearing assembly, causing an adverse effect on the positioning accuracy of the swing arm.

Further, if the actuator block and the pivot bearing assembly are displaced from each other due to a temperature change, this can result in writing and reading-out errors on a recording medium such as a disk device.

Still further, there is a problem that, since the pivot bearing assembly is miniaturized, very small external vibration cannot be absorbed and/or resonance is apt to occur.

These problems would be solved by increasing the dimensional accuracy and rigidity of the constituent components. However, the number of the constituent components is not changed. In addition thereto, the dimensional accuracy of the constituent components must be improved extremely and the machining cost is greatly increased. Thus, the manufacturing cost of the pivot bearing assembly cannot be reduced. In some cases, it is very difficult to machine the constituent components at such a high accuracy. Further, in order to miniature the constituent components, they must be made very thin or fine. Thus, the rigidity of not only the constituent components but also the pivot bearing assembly cannot be maintained at a high level. Still further, since two inner rings are adhered to the shaft and two outer rings are adhered to the sleeve, many portions must be adhered together, causing unavoidable production of out-gas.

SUMMARY OF THE INVENTION

An object of the present invention is to provide a pivot bearing assembly which is miniaturized and wherein manufacturing process and manufacturing cost can be decreased by reducing the number of components, wherein rigidity of the main components is enhanced to lessen the adverse effect caused by the external stress applied to the sleeve and the outer rings, and wherein assembly accuracy of the components is increased to prevent run-out, irregular rotation, change in torque and/or generation of torque spike.

Another object of the present invention is to reduce generation of out-gas.

In order to achieve the objects of the present invention, a pivot bearing assembly comprises a shaft having one end portion forming a reduced portion and the other end portion forming a cylindrical main body coaxial with the reduced portion, first inner ring means disposed on the outer periphery of the reduced portion, second inner ring means integrally formed in the outer periphery of the main body, outer ring means and coaxially surrounding the first and second inner ring means and extending from one end portion of the shaft to the other end portion of said shaft, rolling elements rollably arranged between the first inner ring means and the outer ring means and between the second inner ring means and the outer ring means, and a tolerance ring mounted on the outer periphery of the outer ring means.

The outer ring means comprises an outer ring portion extending from said one end portion of the shaft to the other end portion of the shaft and coaxially surrounding the shaft and a sleeve portion supporting the tolerance ring and surrounding the outer ring portion.

The outer ring means can comprise a cylindrical outer ring which coaxially surrounds the first and second bearings, and a cylindrical sleeve tightly mounted on the outer periphery of the outer ring.

Alternatively, the outer ring means can comprise a cylindrical outer ring portion and a cylindrical sleeve portion integrally forming the outer portion of the outer ring means.

A tolerance ring for elastically connecting the sleeve means to an actuator block is received in a receiving portion formed in the outer peripheral surface of the sleeve portion.

The tolerance ring can have a substantially trapezoidal longitudinal cross section and a transversal cross section with a shape of a circularly arranged series of saw-teeth or a corrugated form.

The receiving portion can comprise an annular groove extending from one end portion of the sleeve portion to the other end portion of the sleeve portion.

Alternatively, the receiving means can comprise annular receiving grooves respectively formed in one end portion and the other end portion of the sleeve portion for receiving the lateral ends of the tolerance ring.

Alternatively, the receiving mean can comprise annular grooves formed in one end portion and the other end portion of the sleeve portion and snap rings held in the annular grooves.

Alternatively, the first inner ring means can comprise an inner ring, and the second inner ring means can comprise an annular groove formed in the outer periphery of the main body portion of the shaft and a portion of the main body portion in the vicinity of the annular groove in the main body portion. The annular groove in the main body portion is adapted to receive the rolling elements.

DETAILED DESCRIPTION OF THE PREFERRED EMBODIMENTS

The present invention will be described in detail by way of preferred embodiments with reference to the accompanying drawings.

Figure 1:
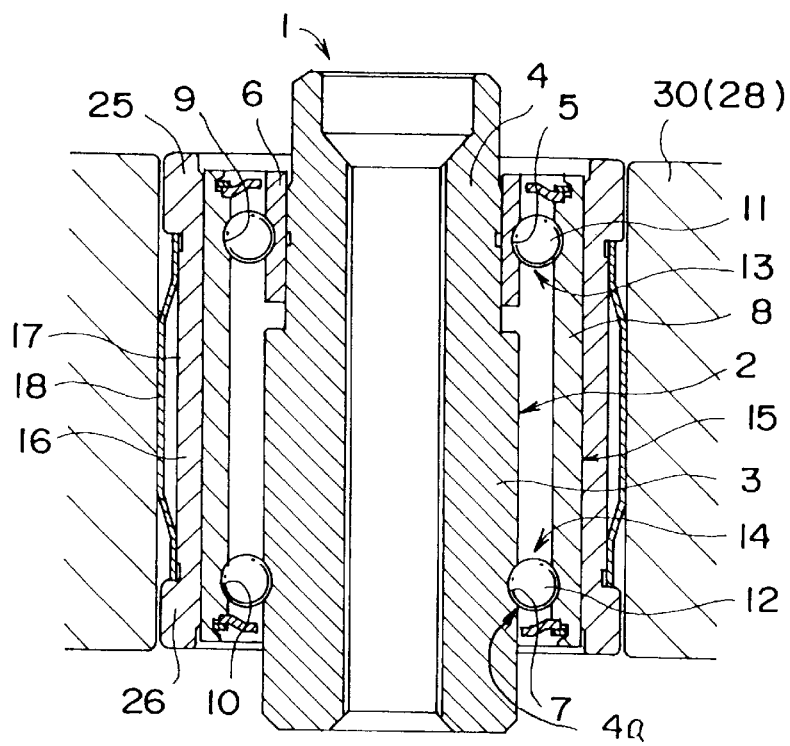
FIG. 1 is a longitudinal cross sectional view of a first embodiment of a pivot bearing assembly according to the present invention.

As shown in FIG. 1 which is a longitudinal cross-sectional view of a pivot bearing assembly of the first embodiment of the present invention, the pivot bearing assembly 1 has a shaft 2. The shaft 2 is made of bearing steel or stainless steel and comprises a cylindrical main body portion 3 and a cylindrical reduced portion 4 coaxially forming one end portion (the upper end portion in FIG. 1) of the shaft 2.

An annular inner ring (a first inner ring) 6 having an annular raceway groove 5 in its outer periphery is fixedly mounted on the reduced portion 4 of the shaft 1 and adhered thereto. The first inner ring 6 constitutes first inner ring means. An annular raceway groove 7 is formed in the outer periphery of the main body portion 3 at the other end of the shaft 1. In this embodiment, the raceway groove 7 and the portion of the main body portion 3 in which the raceway groove 7 is formed constitute a second inner ring 4a or second inner ring means. The outer periphery surface of the first inner ring 6 and the outer periphery surface of the main body portion 3 have diameters substantially equal to each other. A cylindrical outer ring 8 made of bearing steel or stainless steel coaxially surrounds the shaft 2. The outer ring 8 extends from the area of the above-mentioned one end portion of the shaft 2 to the area of the other end portion thereof and is formed with annular raceway grooves 9 and 10 in the corresponding portions to the raceway grooves 5 and 7 of the first and second inner rings 6 and 4a. Between the outer ring 8 and the first inner ring 6 and between the outer ring 8 and the second inner ring 4a are disposed a plurality of balls 11 and 12 made of bearing steel or a ceramic material so as to be rollably received by the raceway grooves 5, 9 and 7, 10.

The first inner ring 6 on the above-mentioned one end portion of the shaft 2, the balls 11 and the outer ring 8 constitute a first bearing 13 and the second inner ring 4a, the balls 12 and the outer ring 8 constitute a second bearing 14.

The outer ring 8 is commonly used to support the first and second bearings 13 and 14. The first and second bearings 13 and 14 constitute a bearing device 15 of a ball bearing type. Instead of the balls 11 and 12, rollers or other rolling elements of the same material as that of the balls 11 and 12 can be used, thereby forming a roller type bearing or a bearing of other type.

The advantage of this structure is that not only the number of the constituent components is reduced but also the shaft 2 is made thicker thereby increasing the rigidity of the pivot bearing assembly because the main body portion 3 is commonly used as a shaft and an inner ring (second inner ring). Since the first bearing 13 requires the inner ring 6 to be preloaded, that portion of the shaft 2 on which the inner ring 6 is mounted must be reduced in diameter so as to be formed as the cylindrical reduced portion 4. The conventional shaft has the same diameter over the whole length. Particularly, those portions of the conventional shaft which receive the first and second bearings have the same diameter. However, the main body portion 3 which forms the major part of the shaft 2 is larger in diameter than the reduced portion 4. Thus, the rigidity of the main body portion 3 is higher than that of the reduced portion 4. In other words, the main body portion 3 of the shaft 2 according to the present invention has higher rigidity than the conventional shaft. Further, since the second inner ring 4a is not a separate element from the main body portion 3 but an integral part thereof, there is no adhesive here. Thus, no out-gas is produced here.

The cylindrical outer ring 8 is fixedly inserted in a cylindrical sleeve 16. A receiving portion 17 having a shape of a wide annular groove is formed in the outer peripheral surface of the sleeve 16 so as to extend from one end portion of the sleeve 16 to the other end portion thereof. A tolerance ring, for example, as shown below is received in the receiving portion 17.

Figure 5:
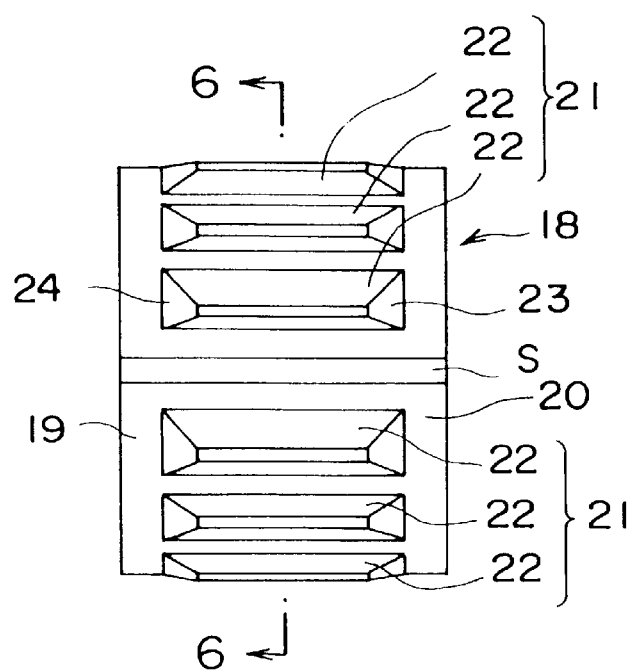
FIG. 5 is a longitudinal cross sectional view of an embodiment of a tolerance ring used for the pivot bearing assembly according to the present invention.
Figure 6:
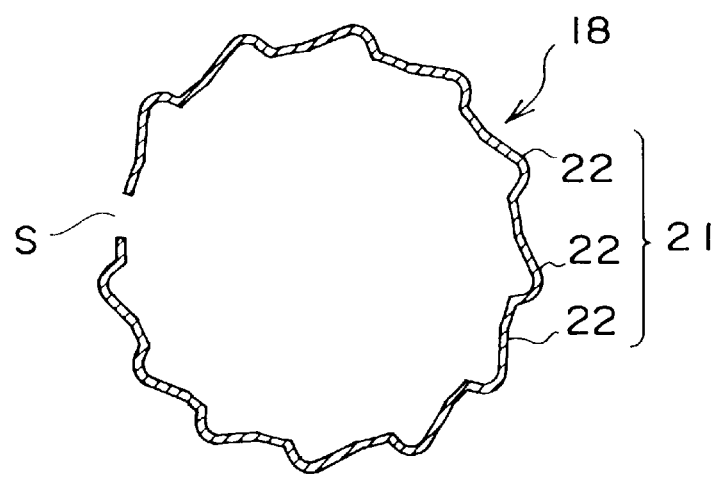
FIG. 6 is a cross sectional view of the tolerance ring along line 6—6 of FIG. 5.

In FIGS. 5 and 6, an embodiment of the tolerance ring is shown at 18. The tolerance ring 18 is made of spring steel. A space S is provided between both edges of the tolerance ring 10 extending along its axis when the tolerance ring 18 is in a free state, i.e., in a state in which no pressing force is applied thereto. The tolerance ring 18 has an inner diameter slightly smaller than the outer diameter of the receiving portion 17 of the sleeve 16 of the pivot bearing assembly 1 in FIG. 3 (for, example, a diameter of 9.5 mm in case the receiving portion 17 has an outer diameter of 10 mm). When the tolerance ring 18 is mounted on the sleeve 16, it is elastically pressed against the receiving portion 17.

Elastic abutting portions 21 are formed on the tolerance ring 18, except for the both lateral end portions 19 and 20 thereof. The saw-tooth portions 22 of the elastic abutting portions 21 are circumferentially arranged in succession so that they assume a wavy or corrugated form. On the lateral side ends of each elastic abutting portion 21 are formed inclined surfaces 23 and 24 extending from the lateral side ends of the saw-tooth portion 22 to the corresponding lateral end portions 19 and 20 of the tolerance ring 18 so that the longitudinal cross section of the elastic abutting portion 21 assumes a low trapezoidal shape. The height of each saw-tooth portion 22 is selected such that its top portion protrudes from the outer peripheral surfaces of flanges 25 and 26 formed on both end portions of the sleeve 16 (see FIG. 1) by a small amount (for example, 0.2 mm for the flanges 25 and 26 having an outer diameter of 11 mm).

Figure 7:
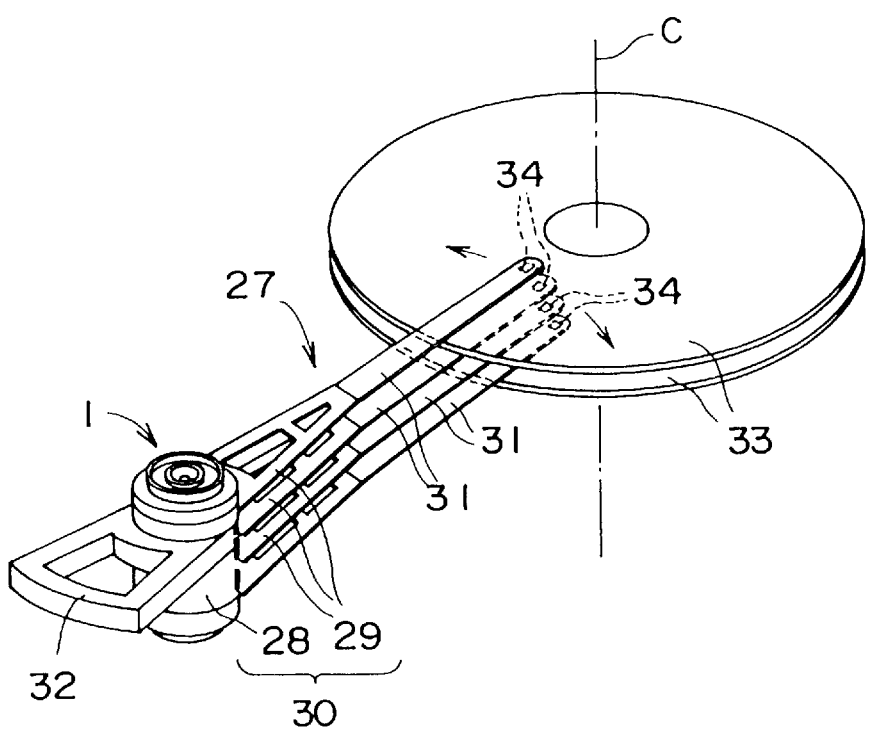
FIG. 7 is a perspective view of the actuator of a disc device mounted on a pivot bearing assembly.

FIG. 7 shows an embodiment of an actuator 27 housed in a disc device (not shown). The actuator 27 has an actuator block 30 comprising a cylindrical portion 28 (which holds the pivot bearing assembly 1) and parallel-arranged arm portions 29 (four in FIG. 7) extending perpendicularly outward from the cylindrical portion 28. A suspension 31 extends radially outward from the tip end of each arm portion 29. The arm portions 29 and the suspensions 31 constitute swing arms. A voice coil portion 32 as well as a magnetic portion (not shown) is formed on the opposite side of the cylindrical portion 28 to the arm portions 29 in the similar way in the conventional arrangement.

Both end portions of the shaft 2 of the pivot bearing assembly 1 are supported in the housing of the disc device, and the actuator 27 is supported on the pivot bearing assembly 1 by mounting the cylindrical portion 28 of the actuator block 30 of the actuator 27 on the pivot bearing assembly 1. As shown in FIG. 7, hard discs 33 are disposed on the disc device so that they are superposed concentrically with respect to the axis of the disc device.

When the actuator block 30 is rotated in the predetermined direction through the predetermined angle around the pivot bearing assembly 1 by a voice coil motor, the suspensions 31 are also similarly rotated in a state in which each pair of suspensions 31 sandwich a hard disc 33, whereby magnetic heads 34 provided on the tip portions of the corresponding suspensions 31 are accurately brought to the recording and read positions on the corresponding hard discs 33. In this way, the signals can be recorded and read out at the accurate positions on the hard discs 33.

Referring to FIG. 1, the actuator block 30 of the actuator 27 is mounted on the pivot bearing assembly 1 on which the tolerance ring 18 has been provided. The inner diameter of the actuator block 30 is slightly larger than the outer diameter of the flanges 25 and 26 (for example, a diameter of 11.1 mm in case the flanges 25 and 26 have an outer diameter of 11 mm) and slightly smaller than the diameter of the circle defined by the tip portions of the saw-tooth portions 17 of the tolerance ring 18 (for example, a diameter of 11.1 mm in case the circle has a diameter of 11.2 mm) when the tolerance ring 18 is received in the receiving portion 17.

When the actuator block 30 is mounted on the pivot bearing assembly 1, the actuator block 30 is elastically fixed to the sleeve 16 by the tolerance ring 18 without contacting the sleeve 16. In this structure, substantially equal load is applied to both end portions of the sleeve 16. Thus, localized loads are not applied from the actuator block 30 to the sleeve 16. Thus, the actuator block 30 and the actuator 27 smoothly rotate around the shaft 2 of the pivot bearing assembly 1 without occurrence of, for example, biting.

Figure 2:
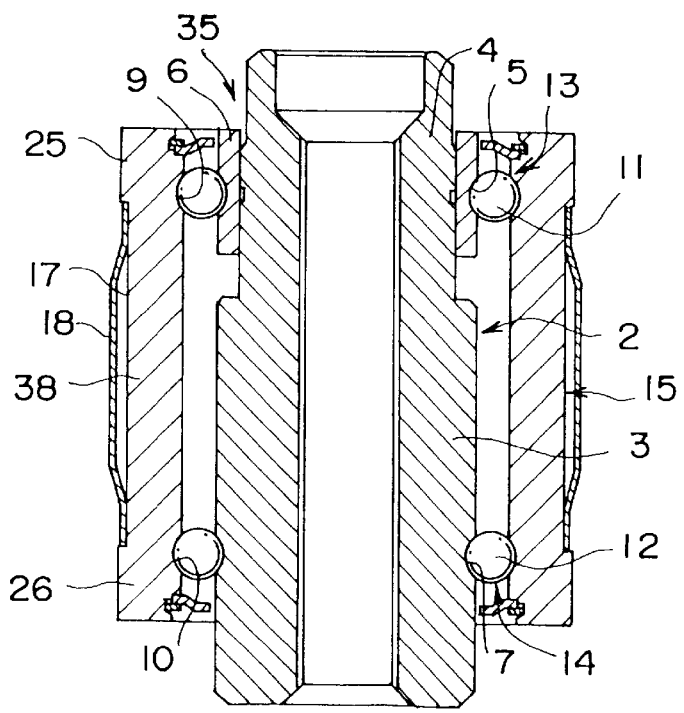
FIG. 2 is a longitudinal cross sectional view of a second embodiment of a pivot bearing assembly according to the present invention.
Figure 3:
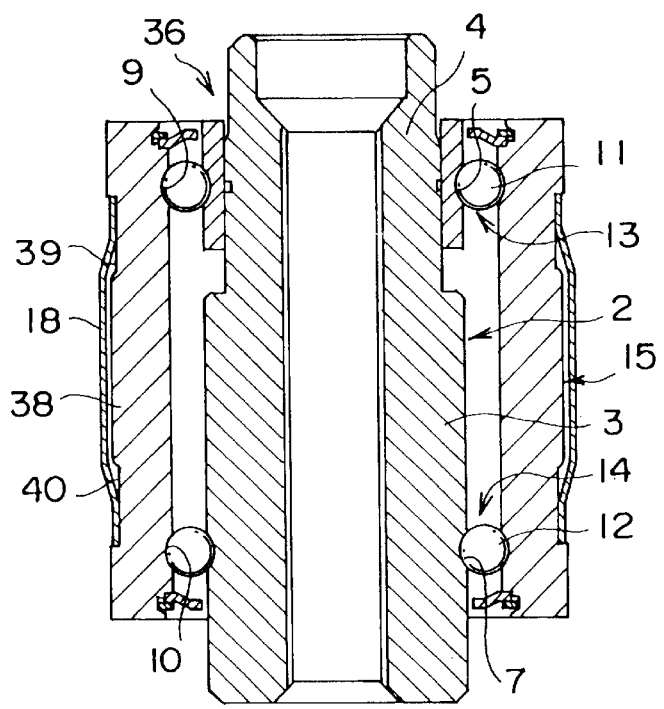
FIG. 3 is a longitudinal cross sectional view of a third embodiment of a pivot bearing assembly according to the present invention.
Figure 4:
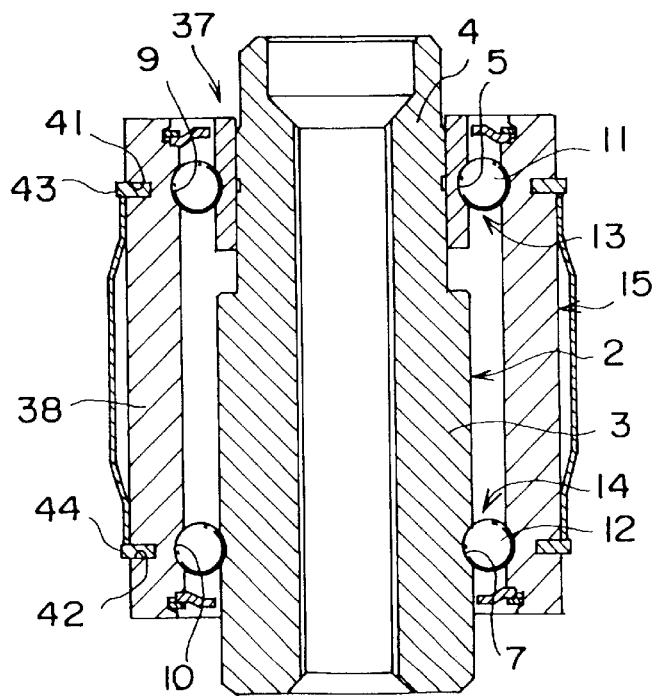
FIG. 4 is a longitudinal cross sectional view of a fourth embodiment of a pivot bearing assembly according to the present invention.

FIGS. 2, 3 and 4 respectively show the second, third and fourth embodiments of pivot bearing assemblies according to the present invention. Pivot bearing assemblies 35, 36 and 37 according to these three embodiments are differently constructed from the pivot bearing assembly 1 in that an outer ring portion and an sleeve portion are formed integrally as a cylindrical outer-ring-sleeve member 38 in each of the three embodiments as shown in FIGS. 2 to 4, while the outer ring 8 and the sleeve 16 are separate elements in the pivot bearing assembly 1 in the first embodiment as shown in FIG. 1. The outer ring-sleeve member 38 is also made of bearing steel or stainless steel and extends between one end portion and the other end portion of the shaft 2. Raceway grooves 9 and 10 are formed in the inner peripheral surfaces of the both end portions of the outer ring-sleeve member 34. The balls 11 are rollably disposed betwen the raceway grooves 5 and 9 and the balls 12 are ably disposed between the raceway grooves 7 and 10. The inner ring 6, the balls and the outer ring-sleeve member 38 constitute a first bearing 13 and the main body portion 13 of the shaft 2, balls 12 and the outer ring-sleeve member 30 constitute a second bearing 14.

The pivot bearing assembly 35 which is the second embodiment of the pivot bearing assembly according to the present invention as shown in FIG. 2 has a receiving portion 17 extending between flanges 25 and 26 formed on the both end portions of the outer ring-sleeve member 38. A tolerance ring 18 as shown in FIGS. 5 and 6 is received in the receiving portion 17. The outer diameter of the flanges 25 and 26 and the outer diameter and the thickness or the depth of the receiving portion 17 are the same as those of the flanges 25 and 26 and the receiving portion 17 of the first embodiment as shown in FIG. 1.

The pivot bearing assembly 36 which is the third embodiment of the pivot bearing assembly according to the present invention as shown in FIG. 3 has an outer ring-sleeve member 38 which has annular grooves 39 and 40 formed in the outer peripheral surface of the both end portions of the outer ring-sleeve member 38. The annular grooves 39 and 40 have the same outer diameter and the thickness as those of the outer ring-sleeve member 38 of the second embodiment of the pivot bearing assembly 35 and receive the lateral end portions 19 and 20 of the tolerance ring 18.

The pivot bearing assembly 37 which is the fourth embodiment of the pivot bearing assembly according to the present invention as shown in FIG. 4 has an outer ring-sleeve member 38 which has annular grooves 41 and 42 formed in the outer peripheral surface of the both end portions of the outer ring-sleeve member 38. Snap rings 43 and 44 are held or fitted in the annular grooves 41 and 42. The outer diameter of the snap rings 43 and 44 is larger than the outer diameter of the outer ring-sleeve member 38 but is smaller than the inner diameter of the actuator block 30 of the actuator 27 so as not to contact the actuator block 30.

When the tolerance ring 18 is mounted on the outer ring-sleeve member 38, the radius of the circle defined by the tops of the saw-tooth portions 22 of the tolerance ring 18 of each of the second to four embodiments of the pivot bearing assembly 1 as shown in FIGS. 2 to 4 is the same as the radius of the circle in the case of the first embodiment of the pivot bearing assembly 1 in FIG. 1. The outer peripheral surface of the outer ring-sleeve member 38 can be formed with two receiving portions 39 and 40 as described with reference to FIG. 3 or two snap rings 43 and 44 as described with reference to FIG. 4 in place of the receiving portion 17 as described with reference to FIG. 1.

In each of the second to fourth embodiments of the pivot bearing assemblies, the outer ring portion and the sleeve portion are formed integrally as a one-body outer ring-sleeve member 38. Thus, the number of the constituent components is reduced thereby to lower the manufacturing cost of the pivot bearing assemblies. Since the outer ring-sleeve member 38 has a combined thickness of the outer ring and the sleeve of the first embodiment or the conventional case, the rigidity of the outer ring-sleeve member 38 is increased very much. However, when the outer ring-sleeve member 38 does not require so high rigidity, the outer ring-sleeve member 38 can be made as thick as the sleeve of the first embodiment or the conventional sleeve. This provides an advantage that each of the pivot bearing assemblies can be miniaturized. Since no adhesive is used to form an outer ring part on the sleeve part, no out-gas is produced from the outer ring-sleeve member 38. Those constituent components and parts of each of the pivot bearing assemblies 35, 36 and 37 according to the embodiments 2 to 4 which correspond to those of the pivot bearing assembly 1 according to the first embodiment are shown by the same reference numerals and the description thereof is omitted.

With the present invention, the assembly process of the pivot bearing assembly is reduced. Thus, the manufacturing cost of the pivot bearing assembly is lowered. Since the shaft can be made thicker an/or the outer ring-sleeve member is made thicker so that the shaft and/or the outer ring-sleeve member can be made thicker, their rigidity can be enhanced. This increases the assembly accuracy of the constituent components, prevents the generation of run-out, irregular rotation and change in torque and production of torque spike of the pivot bearing assembly, thereby improving the operational stability.

Similarly to the pivot bearing assembly 1 according to the first embodiment, the pivot bearing assemblies 35, 36 and 37 according the second to fourth embodiments are used to rotatably support the actuator as shown in FIG. 7. The way of mounting the actuator 7 on each of the pivot bearing assemblies 35, 36 and 37 is the same as the mounting method in case of the first embodiment, and their operation is the same as that of the pivot bearing assembly 1 according to the first embodiment.

Throughout all embodiments of the pivot bearing assembly according to the present invention, the inner ring 6 constitutes first inner ring means, and the raceway groove 7 in the shaft 3 and the portion of the main body portion 3 in the vicinity of the raceway groove 3 constitute second inner ring means. The outer ring 8 and the sleeve 16 in the first embodiment and the outer ring-sleeve member 38 in each of the second to fourth embodiments constitute outer ring means. The outer ring 8 in the first embodiment and inner portion of the outer ring-sleeve members 38 in the second to fourth embodiments constitute an outer ring portion, and the sleeve 16 and the outer portion of the sleeve-ring member 38 in each of the second to fourth embodiments constitute a sleeve portion. The annular grooves 39 and 40 in the third embodiments and the annular grooves 41 and 42 and the snap rings 43 and 44 also constitute receiving portions.

What is claimed is:

1. A pivot bearing assembly comprising:
   a shaft having one end portion and an other end portion, said other end portion having an outer periphery and forming a cylindrical main body and said one end portion having an outer periphery and being coaxial with said cylindrical main body and forming a cylindrical reduced portion;
   first inner ring means disposed on said outer periphery of said reduced portion;
   second inner ring means integrally formed in said outer periphery of said main body;
   outer ring means having an outer periphery and coaxially surrounding said first and second inner ring means and extending from said one end portion of said shaft to said other end portion of said shaft;
   rolling elements rollably arranged between said first ring means and said outer ring means and between said second ring means and said outer ring means; and
   a tolerance ring mounted on said outer periphery of said outer ring means,
   wherein said outer ring means comprises an outer ring portion extending from said one end portion of said shaft to said other end portion of said shaft and coaxially surrounding said shaft and a sleeve portion surrounding said outer ring portion, said sleeve means supporting said tolerance ring,
   wherein said sleeve portion has an outer periphery, and receiving means for receiving said tolerance ring is formed in said outer periphery of said sleeve portion, and
   wherein said tolerance ring has lateral end portions, said sleeve portion has one end portion and the other end portion, and said receiving means comprises annular grooves formed in said one end portion and said other end portion of said sleeve portion for receiving said lateral end portions of said tolerance ring.

2. The pivot bearing assembly according to claim 1, wherein said sleeve portion is integral with said outer ring portion.

3. The pivot bearing assembly according to claim 1, wherein said outer ring portion comprises a cylindrical outer ring and said sleeve portion comprises a cylindrical sleeve separately formed from said outer ring and surrounding said outer ring so as to be fixedly mounted thereon.

4. A pivot bearing assembly comprising:
   a shaft having one end portion and an other end portion, said other end portion having an outer periphery and forming a cylindrical main body and said one end portion having an outer periphery and being coaxial with said cylindrical main body and forming a cylindrical reduced portion;
   first inner ring means disposed on said outer periphery of said reduced portion;
   second inner ring means integrally formed in said outer periphery of said main body;
   outer ring means having an outer periphery and coaxially surrounding said first and second inner ring means and extending from said one end portion of said shaft to said other end portion of said shaft;
   rolling elements rollably arranged between said first ring means and said outer ring means and between said second ring means and said outer ring means; and
   a tolerance ring mounted on said outer periphery of said outer ring means,
   wherein said outer ring means comprises an outer ring portion extending from said one end portion of said shaft to said other end portion of said shaft and coaxially surrounding said shaft and a sleeve portion surrounding said outer ring portion, said sleeve means supporting said tolerance ring,
   wherein said sleeve portion has an outer periphery, and receiving means for receiving said tolerance ring is formed in said outer periphery of said sleeve portion, and
   wherein said sleeve portion has one end portion and an other end portion, and said receiving means comprises snap rings and annular grooves each receiving a corresponding one of said snap rings are formed in said one end portion and said other end portion of said sleeve portion and said snap rings, respectively.

5. The pivot bearing assembly according to claim 4, wherein said sleeve portion is integral with said outer ring portion.

6. The pivot bearing assembly according to claim 4, wherein said outer ring portion comprises a cylindrical outer ring and said sleeve portion comprises a cylindrical sleeve separately formed from said outer ring and surrounding said outer ring so as to be fixedly mounted thereon.

7. A pivot bearing assembly comprising:
   a shaft having one end portion and an other end portion, said other end portion having an outer periphery and forming a cylindrical main body and said one end portion having an outer periphery and being coaxial with said cylindrical main body and forming a cylindrical reduced portion;

first inner ring means disposed on said outer periphery of said reduced portion;

second inner ring means integrally formed in said outer periphery of said main body;

outer ring means having an outer periphery and coaxially surrounding said first and second inner ring means and extending from said one end portion of said shaft to said other end portion of said shaft;

rolling elements rollably arranged between said first ring means and said outer ring means and between said second ring means and said outer ring means; and a tolerance ring mounted on said outer periphery of said outer ring means, wherein said tolerance ring has a transversal cross section with a shape of series of circularly arranged saw teeth.

8. The pivot bearing assembly according to claim 7, wherein said outer ring means comprises an outer ring portion extending from said one end portion of said shaft to said other end portion of said shaft and coaxially surrounding said shaft and a sleeve portion surrounding said outer ring portion, said sleeve means supporting said tolerance ring.

9. The pivot bearing assembly according to claim 8, wherein said sleeve portion is integral with said outer ring portion.

10. The pivot bearing assembly according to claim 8, wherein said outer ring portion comprises a cylindrical outer ring and said sleeve portion comprises a cylindrical sleeve separately formed from said outer ring and surrounding said outer ring so as to be fixedly mounted thereon.

* * * * *